July 9, 1929.　　　　　J. JONAS　　　　　1,719,843

DEVICE FOR ESTABLISHING A TAPPABLE NEUTRAL POINT IN THREE-PHASE NETWORKS

Filed April 15, 1926

J. Jonas
INVENTOR

By: Marks & Clark
Attys

Patented July 9, 1929.

1,719,843

UNITED STATES PATENT OFFICE.

JULIUS JONAS, OF BADEN, SWITZERLAND, ASSIGNOR TO AKTIENGESELLSCHAFT BROWN, BOVERI AND CIE., OF BADEN, SWITZERLAND.

DEVICE FOR ESTABLISHING A TAPPABLE NEUTRAL POINT IN THREE-PHASE NETWORKS.

Application filed April 15, 1926, Serial No. 102,345, and in Germany June 20, 1925.

For establishing a tappable neutral point in three phase networks, more particularly for connecting neutral point choking coils, i. e. for earthing over an inductance, three phase choking coils are frequently used, the star point of which is led out and represents the tappable neutral point. If this neutral point be earthed over a blow-out coil, on an earth leakage occurring the earth leakage current will flow through the three-phase windings of the choking coil. A magnetic field will result, which is equidirectional in the three limbs of the coil and which closes from yoke-piece to yoke-piece through the air. This magnetic field is however undesirable and, in order to suppress it, back-turns are wound on the limbs of the choking coil, which are connected in the earthing circuit in series with the blow-out coil. These back-turns must, however, have approximately the same weight of copper as the main windings of the choking coil. Hence they considerably increase the size of the choking coil providing the tappable neutral point required for the work performed by the blow-out coil. Assuming the work performed by the blow-out coil (earth leakage current multiplied by phase voltage) to be equal to 1, the size of choking coil required will correspond to the value 2.

A considerably smaller choking coil for the tappable neutral point can be arrived at, if instead of the star-connection the Scott connection be used, as with the latter the provision of back-turns for compensating the ampere turns produced by the earth leakage current is not required.

The present invention therefore has for its object to provide an arrangement for establishing a tappable neutral point in three-phase network, in which two single-phase choking coils in Scott connection are connected up to the three-phase network, the common neutral point of which is led out and may be used for connecting a neutral point earthing arrangement.

The invention is described with reference to the diagram in Figure 1, and the constructional example shown in Figure 2 of the accompanying drawing.

Figure 1:
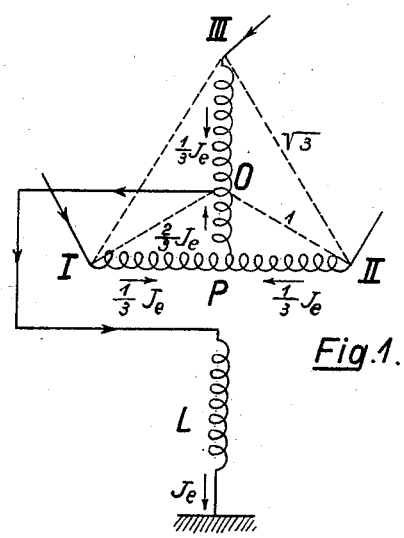

In Figure 1, I, II and III are the three conductors of the three-phase network. Between I and II a single-phase choking coil I—P—II is connected up, the centre point of the winding of which is marked P. Between P and the conductor III is a single-phase choking coil P—O—III containing the neutral point O of the system. As in the voltage triangle of the network the voltage at P—O—III is perpendicular to the voltage connected to I—P—II, O divides the perpendicular P—O—III in the ratio of 1:3 and therefore P O=½ O—III. The point O is led out and in the case shown serves the purpose of connecting the blow-out coil L which, in the case of an earth leakage occurring conveys the earth leakage current $J_e$. This earth leakage current is distributed in the following manner over the windings of the two single-phase choking coils: In the choking coil I—P—II there flows a current having the value $\frac{J}{3}$, in each of the two halves of the windings of the coil, such that the ampere turns of I—P and P—II compensate one another. In the choking coil P—O—III in the part P—O of the same, a current flows having the value $\frac{2}{3}J$, while in O—III there flows a current having the value $\frac{J}{3}$. As however the number of turns of O—III is twice as great as that of P—O and as the magnetomotive forces of the two parts are opposed to each other, the ampere turns produced by the earth leakage current compensate one another in this choking coil as well. Back-turns for compensating a field produced by the leakage current in the choking coil system are therefore not required. The two single-phase choking coils may each have a separate or a common iron core. In the latter case it is possible to use a three limbed iron core, such as is shown in the constructional example in Figure 2.

Figure 2:
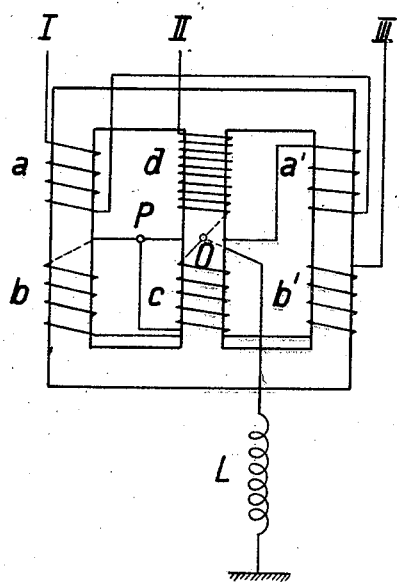

In Figure 2 the same parts have the same references as in Figure 1. The coil I P is however divided into the two half coils $a$ and $a'$ and the coil P II into the two half coils $b$ and $b'$. Coils $a$ and $b$ lie on one of the outer limbs of the iron core, while coils $a'$ and $b'$ lie on the other core outer limb. The direction of winding is such that a voltage between the points I—II, for instance the voltage of the network, produces in the windings a field, for which the two outer core limbs are arranged in series and which therefore does not pass through the middle limb. The parts $c$ and $d$ of the winding P O III are arranged on the middle core limb. The effective cross-sectional area of the winding part $c$ is made twice as great as that of the winding part $d$. To this end, the winding part $c$ might be comprised of two conductors connected in parallel. The direction in which these windings are wound is such that their magnetomotive forces assist one another when a voltage is impressed between the points P and III. The field produced passes through the middle core and then divides into the two outer limbs, which are in parallel as regards this field. In the outer limbs on the other hand the fields of the two choking coils are superposed, by adding up geometrically.

What I claim is:

1. In apparatus of the character described, a three-phase network, two single-phase reactance coils connected to said network and to each other to provide a Scott connection having a neutral point, and an earthing device connected to said neutral point.

2. Apparatus as claimed in claim 1, characterized by the feature that the two reactance coils have a common three-limbed iron core, on which they are so disposed that, when excited from the network voltage, the magnetomotive forces of the parts of the winding of one of the coils produce a field which passes through the two outer limbs in series, while the parts of the winding of the other coil produce a field which passes through the middle limb and in series with it as to one half through each of the two outer limbs, which appear to be in parallel with respect to the said field.

3. Apparatus as claimed in claim 1, characterized by the feature that in the coil containing the common neutral point that part of the winding, which has the smallest number of turns, is given a conducting cross-sectional area which is about twice as great as that of the part of the winding having the larger number of turns, the larger cross-sectional area being optionally obtained by connecting two conductors in parallel.

4. An electrical device of the class described comprising a three-limb magnetic core, one quarter-phase winding disposed on one of the limbs of said core, another quarter-phase winding having one half disposed on one of the other two limbs of the core and a second half on the other of the two limbs of said core, said first quarter-phase winding being connected to the center of said second quarter-phase winding to constitute a Scott connection wherein the three end terminals of said two quarter-phase windings form a three-phase terminal system, and a neutral tapping connection on said first-mentioned quarter-phase winding, said windings being so arranged on said core as to impede the current flow between said three-phase terminals on application of a three-phase voltage thereto while offering negligible impedance only to the flow of current between said neutral tapping connection and said three-phase terminals.

5. An electrical device of the class described comprising a three-limb magnetic core, one quarter-phase winding disposed on one of the limbs of said core, another quarter-phase winding having one half disposed on one of the other two limbs of the core and a second half on the other of the two limbs of said core, said first quarter-phase winding being connected to the center of said second quarter-phase winding to constitute a Scott connection wherein the three end terminals of said two quarter-phase windings form a three-phase terminal system, and a neutral tapping connection on said first-mentioned quarter-phase winding.

6. In apparatus of the class described, a first quarter-phase winding, a second quarter-phase winding, said first quarter-phase winding being connected to the center portion of the second quarter-phase winding in Scott connection so that the three end terminals constitute a three-phase system, and a neutral tapping point on the first-mentioned quarter-phase winding disposed at a point that is in potential equilibrium with respect to the three-phase terminals of said windings, said windings being so arranged as to impede current flow between said three-phase terminals on application of a three-phase voltage thereto while offering negligible impedance only to the flow of current between said neutral tapping connection and said quarter-phase terminals.

7. In apparatus of the class described, a three-limb core, a first quarter-phase winding and a second quarter-phase winding constituting, respectively, the height and the base of an equilateral triangle arranged in Scott connection so that the three end terminals thereof form a three-phase system, the height-winding being disposed on one core limb and having at a point one-third above the base connection a neutral tapping terminal, the base-winding being divided into two half portions each composed of two quarter sections, the quarter sections of each half portion being disposed pairwise on the two other core limbs, the quarter sections disposed on the same core limb being so arranged that a current flowing from the neutral tap terminal to the terminal phases produces in said quarter sections magneto-motive forces that oppose and neutralize each other.

In testimony whereof I have signed my name to this specification.

JULIUS JONAS.